United States Patent [19]
Morris, Jr. et al.

[11] Patent Number: 5,913,239
[45] Date of Patent: Jun. 15, 1999

[54] MASS FLOW MEASUREMENT DEVICE

[75] Inventors: Corydon E. Morris, Jr., Columbus; Daniel L. Morin, North Vernon, both of Ind.

[73] Assignee: Cummins Engine Company, Inc., Columbus, Ind.

[21] Appl. No.: 08/877,303

[22] Filed: Jun. 17, 1997

[51] Int. Cl.$^6$ ................................................. G01M 15/00
[52] U.S. Cl. ............................ 73/118.2; 73/113; 73/117.3
[58] Field of Search .............................. 73/112, 113, 114, 73/116, 117.2, 117.3, 118.2

[56] References Cited

U.S. PATENT DOCUMENTS

| | | | |
|---|---|---|---|
| 3,987,671 | 10/1976 | Monaghan | 73/114 |
| 4,073,274 | 2/1978 | Saito | 123/119 R |
| 4,079,623 | 3/1978 | Erwin, Jr. | 73/113 |
| 4,121,549 | 10/1978 | Martin et al. | 123/32 EA |
| 4,134,301 | 1/1979 | Erwin, Jr. | 73/113 |
| 4,420,972 | 12/1983 | Kuroiwa et al. | |
| 4,552,015 | 11/1985 | Emmett et al. | 73/113 |
| 4,558,678 | 12/1985 | Nishimura et al. | 73/118.2 |
| 4,571,990 | 2/1986 | Honig | 73/118.2 |
| 4,790,178 | 12/1988 | Usui et al. | |
| 4,887,577 | 12/1989 | Arai et al. | 73/118.2 |
| 4,974,445 | 12/1990 | Arai et al. | |
| 5,083,455 | 1/1992 | Saito et al. | |
| 5,119,672 | 6/1992 | Pfeiffer et al. | |
| 5,167,147 | 12/1992 | Peters et al. | |
| 5,168,762 | 12/1992 | Gill | |
| 5,186,044 | 2/1993 | Igarashi et al. | |
| 5,381,691 | 1/1995 | Miyazaki et al. | 73/118.2 |
| 5,567,873 | 10/1996 | Toyoda | 73/117.3 |

FOREIGN PATENT DOCUMENTS 2 065 898  1/1981  United Kingdom.

OTHER PUBLICATIONS

U.K. Search Report dated Jul. 17, 1998.

*Primary Examiner*—Richard Chilcot
*Assistant Examiner*—Eric S. McCall
*Attorney, Agent, or Firm*—Sixbey, Friedman, Leedom & Ferguson; Donald R. Studebaker

[57] ABSTRACT

A gas mass flow sensor for sensing the flow of a gas to an internal combustion engine including a main flow passage having an inlet and an outlet for directing a gas flow to the internal combustion engine with the inlet communicating with a source of the gas and an outlet communicating with the internal combustion engine. A secondary flow passage for isolating a portion of the gas flow from the main flow passage is provided with the secondary flow passage including an inlet surrounding the main flow passage and a flow sensing section. Positioned within the flow sensing section of the secondary flow passage is a gas mass flow sensor for sensing the mass flow of gas through the secondary passage which is indicative of the mass flow through the main flow passage. Positioned within the main flow passage is a nozzle with the nozzle including a nozzle inlet and nozzle outlet wherein the outer diameter of the nozzle inlet is less than an inner diameter of the main flow passage with the inlet of the secondary flow passage being in the form of an annulus between the nozzle inlet and the main flow passage. The mass flow sensor may be incorporated into a unitary mass flow sensing and mixing module for sensing a flow of both air and fuel as well as for mixing the air and fuel together for delivery to an internal combustion engine.

19 Claims, 6 Drawing Sheets

MASS FLOW MEASUREMENT DEVICE

TECHNICAL FIELD

The present invention is directed to a mass flow measurement device for accurately measuring the flow of a gas to an internal combustion engine. More particularly, the present invention is directed to a unitary device for measuring the mass flow of air and compressed natural gas for delivery to an internal combustion engine and mixing the air and gas with one another prior to delivery to the internal combustion engine.

BACKGROUND OF THE INVENTION

Many types of air and gas mass flow sensors are presently available for use in connection with internal combustion engines. In most cases, the air intake passage is generally constituted by two flow passages, a main flow passage and an auxiliary flow passage. Often times a hot wire sensor is arranged in the auxiliary flow passage for sensing the flow of air through the passage. One type of mass flow meter including an auxiliary passage range parallel to the main passage is known as a bypass type sensor. A well known bypass type air sensor is disclosed in U.S. Pat. No. 4,723,443 in which the auxiliary passage has first and second flow passages connected transverse to one another. The first flow passage is formed in parallel with the main passage that includes the hot wire sensor disposed within the first flow passage with the second flow passage being arranged perpendicular to the main flow passage thereby returning the flow of air to the main passage. In such an air flow device, the throttle body thereof is divided to form the second flow passage of the auxiliary passage and an isolator is interposed between the divided parts. The second flow passage of the auxiliary passage has a shoulder portion at a location where the second flow passage communicates with the first flow passage. This shoulder portion includes an enlarged width which results in a dead volume of air flow in the auxiliary passage which often times results in inaccurate mass flow measurements.

Another typically known bypass type air flow sensing device is illustrated in U.S. Pat. No. 4,501,249 which includes a second flow passage of an auxiliary passage being arranged radiantly with respect to the main flow passage. Such a device would result in inaccurate mass flow readings in that the air flow cannot be readily conditioned to simulate the mass flow through the main passage.

In an effort to overcome the aforementioned shortcomings, U.S. Pat. No. 4,790,178 and assigned to Hitachi, Ltd. discloses an intake structure for an internal combustion engine including a bypass intake passage for measuring the flow of air to the internal combustion engine. Therein, the intake structure includes a throttle body and an intake body connected to the upstream end of the throttle body which is provided with a bypass air passage for mounting an air flow meter therein. The bypass flow passage portion including the flow meter extends substantially parallel to the intake air passage, however, only a single limited inlet is provided adjacent the intake air passage which may readily result in an uneven and non-representative flow of air through the bypass passage thus resulting in an accurate air flow reading. Similar to U.S. Pat. No. 4,723,443, the return passage extends substantially perpendicular to the bypass passage which again may result in inaccurate mass flow readings.

In yet another effort to overcome the above noted shortcomings, the air flow meter set forth in U.S. Pat. No. 5,119,672 assigned to Robert Bosch GMBH includes an extended bypass passage in an effort to develop a more accurate mass flow measurement. While the extended bypass passage is shifted in the flow direction upstream of the deflection of the air flow into a region of quasi-laminar flow, as with the previous devices utilizing a limited inlet for the bypass flow passage may result in an inaccurate flow measurement for the reasons discussed herein above.

In yet another attempt to ascertain an accurate air mass flow measurement, U.S. Pat. No. 5,186,044 issued to Iragaci et al. discloses an air flow rate measuring device for an internal combustion engine including an auxiliary air passage positioned in a portion of the intake air passage for measuring the air mass flow of the intake passage. However, again such a device obstructs a portion of the intake air flow passage and provides only a inlet in a limited region of the intake air passage for the auxiliary passage which as discussed herein above may result in inaccurate mass flow measurements.

Clearly, there is a need for a mass flow measurement device for measuring air mass flow and gas mass flow to an internal combustion engine. Particularly, there is a need for a device which is able to measure large and small flows with the same basic sensor for use with various engine capacities, one which is insensitive to upstream flow conditions and the particular passage geometry and one which is repeatable from sensor to sensor and from engine to engine to allow interchangability in the field. Moreover, there is a need for a unitary sensing device which senses both the air flow to the internal combustion engine as well as the fuel flow to the internal combustion engine and which provides for a mixing of the fuel with the air being directed to the internal combustion engine.

SUMMARY OF THE INVENTION

A primary object of the present invention is to overcome the aforementioned shortcomings associated with the prior art sensing devices.

A further object of the present invention is to provide a mass flow measuring device which is capable of measuring both large and small flows with the same basic sensor.

A still further object of the present invention is to provide a mass flow sensor which provides an average value of the static pressure in the main flow passage to a bypass flow passage in order to accurately sense the mass flow through the main flow passage.

A still further object of the present invention is to provide an auxiliary passage wherein the flow of gas from the main flow passage is evenly distributed in a symmetrical manner as it passes the sensing device.

Yet another object of the present invention is to provide a flow through the auxiliary passage which is consistent, uniform and evenly distributed as the flow passes the sensing element.

These as well as additional objects of the present invention are achieved by providing a gas mass flow sensor for sensing the flow of a gas to an internal combustion engine including a main flow passage having an inlet and an outlet for directing a gas flow to the internal combustion engine with the inlet communicating with a source of the gas and an outlet communicating with the internal combustion engine. A secondary flow passage for isolating a portion of the gas flow from the main flow passage is provided with the secondary flow passage including an inlet surrounding the main flow passage and a flow sensing section. Positioned within the flow sensing section of the secondary flow passage is a gas mass flow sensor for sensing the mass flow of gas through the secondary passage which is indicative of the mass flow through the main flow passage. Positioned within the main flow passage is a nozzle with the nozzle including a nozzle inlet and nozzle outlet wherein the outer diameter of the nozzle inlet is less than an inner diameter of the main flow passage with the inlet of the secondary flow passage being in the form of an annulus between the nozzle inlet and the main flow passage. Additionally, an annulus is provided about an inlet of the flow sensing section of the secondary flow passage for providing symmetrical gas flow through the flow sensing section. This symmetrical gas flow is aided by providing a calibration orifice positioned downstream of the mass flow sensor. Particularly, the flow characteristics of the calibration orifice and nozzle are maintained substantially equal so as to ensure that the flow of gas through the sensing section of the secondary flow passage is indicative of the gas mass flow through the main flow passage.

In furtherance of the present invention, the above gas mass flow sensor concept has been developed into a unitary mass flow sensing and mixing module for sensing a flow of both air and fuel as well as for mixing the air and fuel together for delivery to an internal combustion engine. In this regard, the air mass flow sensor portion of the module includes a main flow passage having an inlet and an outlet for directing an air flow to the internal combustion engine with the inlet communicating with a source of intake air and the outlet communicating with the internal combustion engine. A secondary flow passage for isolating a portion of the air flow from the main flow passage is provided with the secondary flow passage including an inlet surrounding the main flow passage as well as a flow sensing section. Positioned within the flow sensing section of the secondary passages is an air mass flow sensor for sensing the mass flow of air through the secondary passage which is indicative of the air mass flow through the main flow passage. In order to direct a portion of the air mass flow from the main flow passage to the secondary flow passage, a nozzle is provided in the main flow passage with the nozzle including a nozzle inlet and nozzle outlet wherein the outer diameter of the nozzle inlet is less than an inner diameter of the main flow passage thus forming an inlet of the secondary flow passage which extends 360° around the perimeter of the main flow passage. This inlet directs an average air mass flow to an annulus which is provided at an inlet of the flow sensing section of the secondary flow passage for providing symmetrical air flow through the flow sensing section. This symmetrical air flow is aided by providing a calibration orifice positioned downstream of the mass flow sensor.

Also provided within the unitary mass flow sensing module is a fuel mass flow sensor for sensing the mass flow of compressed natural gas to be mixed with the air mass flow and subsequently directed to the internal combustion engine. As with the air mass flow sensor, the fuel mass flow sensor includes an inlet and an outlet for directing the fuel flow to the internal combustion engine with the inlet communicating with a source of compressed natural gas and the outlet communicating with the main flow passage of the air mass flow sensor. Likewise, a secondary flow passage for isolating a portion of the fuel mass flow from the main flow passage is provided with the secondary flow passage including an inlet surrounding the main flow passage and a flow sensing section. Positioned within the flow sensing section of the secondary flow passage is a fuel mass flow sensor for sensing the mass flow of fuel through the secondary passage which is indicative of the mass flow through the main flow passage. In order to obtain a sampling of fuel mass flow which is indicative of the mass flow of fuel through the main flow passage, a nozzle is positioned within the main flow passage. This nozzle includes an inlet and an outlet wherein the outer diameter of the nozzle inlet is less than an inner diameter of the main flow passage with the inlet of the secondary flow passage being in the form of an annulus between the nozzle inlet and the main flow passage. Further, an annulus is provided about an inlet of the fuel flow sensing section of the secondary flow passage for providing symmetrical fuel flow through the flow sensing section. Symmetrical fuel flow is aided by providing a calibration orifice position downstream of the mass flow sensor. In this regard, the flow characteristics of the calibration orifice and the nozzle are maintained substantially equal so as to ensure that the flow of fuel through the sensing section of the secondary flow passage is indicative of the fuel mass flow through main flow passage of the fuel mass flow sensor. In order to adequately mix the fuel with the air flow in the main air flow passage, a plenum is formed about the nozzle positioned in the main flow passage and a plurality of outlets are formed in the nozzle which permits the fuel to be disbursed about the entire periphery of the nozzle which aides in the mixing of the fuel with air flowing through the main air mass flow passage and consequently being directed to the internal combustion engine.

These, as well as additional advantages of the present invention will become apparent from the following detailed description when read in light of the several figures.

DETAILED DESCRIPTION OF THE PRESENT INVENTION

Figure 1:
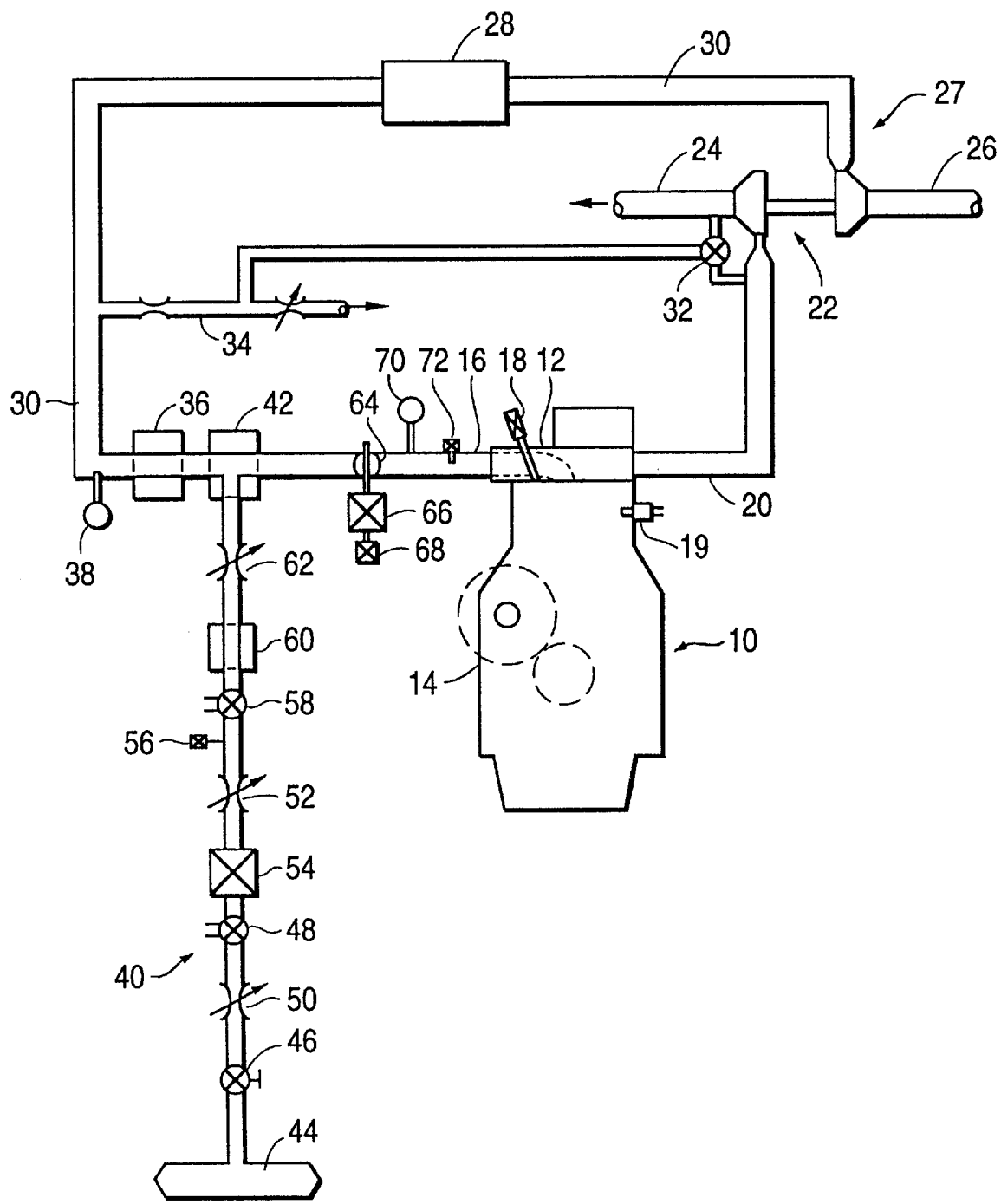
FIG. 1 is a schematic diaphragm of an engine incorporating the compressed natural gas mass flow sensor and air mass flow sensor in accordance with the present invention.
Figure 2:
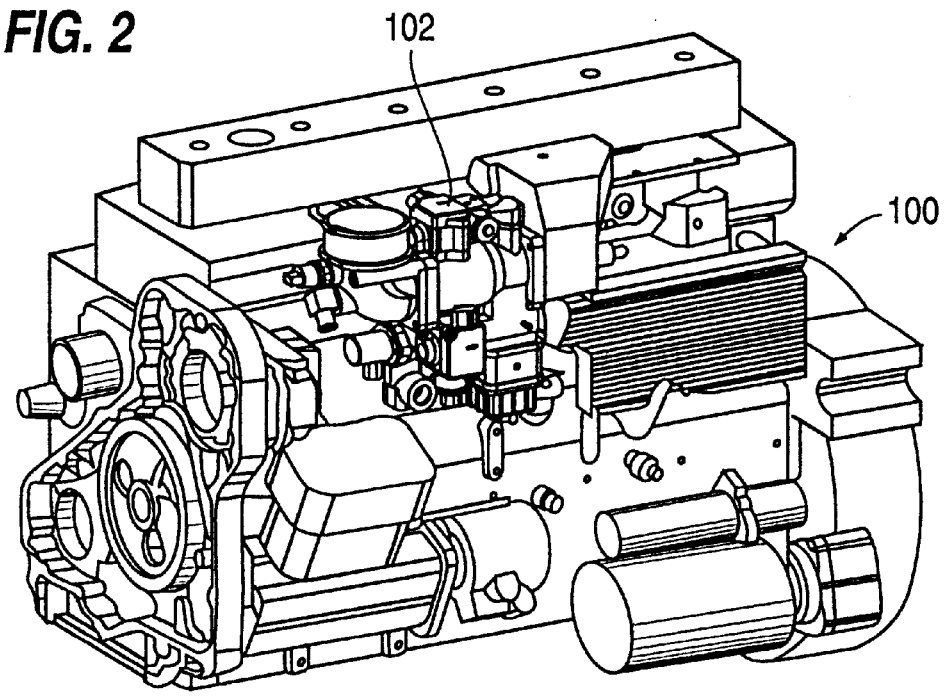
FIG. 2 is a perspective view of the mass flow sensor module positioned on an internal combustion engine in accordance with the present invention.

Initially, FIGS. 1 and 2 illustrate the overall system to which the present invention is readily adapted. Particularly, the schematic illustration set forth in FIG. 1 illustrates the various flow passages and components as they relate to one another, however, the particular incorporation of the elements into a particular system may vary.

As illustrated in FIG. 1, the intake air circuit and natural gas circuit are illustrated as independent flow circuits, however, as will be discussed in greater detail hereinbelow, many of the components of each of the flow circuits are preferably provided in a single unitary module. Initially, as is illustrated in FIG. 1, the system is provided for directing an air fuel mixture to an internal combustion engine 10. The internal combustion engine 10 includes a head 12 and crankcase 14 with the intake air fuel mixture being directed to the head 12 of the internal combustion engine 10 by way of passage 16. In a known manner, a coil and plug 18 are provided in the head 12 of the internal combustion engine 10. Also, the internal combustion engine 10 may include a temperature sensor 19. Emanating from the internal combustion engine is an exhaust passage 20 which connects with turbo-charger 22 in a known manner with the exhaust gas being subsequently treated in a known manner through passage 24. Additionally, in a conventional manner is provided an air inlet passage 26 which provides fresh intake air to the intake side of the turbo-charger 22 of an air flow circuit 27 which is compressed and passed to the after cooler 28 through passage 30. Provided between the intake air passage 30 and exhaust passage 20 is a waste gate 32 and waste gate control device 34. Such a waste gate system being known in the art.

Positioned within the passage 30 is an air mass sensor 36, the structure of which will be discussed in greater detail hereinbelow. Upstream of the air mass sensor is the pressure sensor 38 for sensing the pressure of the air passing through passage 30. Provided at a junction between the air flow circuit 27 and a fuel flow circuit 40 is a mixer 42. Preferably, the air fuel mixer is of the type disclosed in U.S. patent application Ser. No. 581,961 filed Jan. 2, 1996 and assigned to the assignee of the subjected invention. Again, further details of the air gas mixer will be discussed hereinbelow.

The fuel flow circuit 40 includes a tank 44 for containing compressed natural gas which is used as a fuel source for the internal combustion engine 10. Many of the components discussed with respect to the fuel flow circuit 40 are known and will only be briefly mentioned herein. Initially, the fuel flow circuit 40 includes both a manual shut-off valve 46 and an electronic shut-off valve 48 for stopping the flow of fuel through the fuel flow circuit 40. Also provided are pressure regulators 50 and 52 positioned both upstream and downstream of a filter 54. Downstream of the filter 54 is provided a fuel temperature sensor 56 and second electronic shut-off valve 58. The critical portion of the fuel flow circuit 40 in accordance with the present invention is the gas mass flow sensor 60, the details of which will be discussed in greater detail hereinbelow. Also provided in the fuel flow circuit 40 is a constant volume flow control valve 62.

As discussed hereinabove, fuel from the fuel flow circuit 40 is mixed with compressed air from the air flow circuit 27 at the mixer 42. Controlling the flow of air through the mixer 42 is a throttle valve 64 which includes an actuator 66 and position sensor 68. Additionally, the pressure and temperature of the air fuel mixture is sensed by pressure sensor 70 and temperature sensor 72 prior to being delivered to the internal combustion engine 10. All of the above described components are readily controlled by an electronic control module (not shown) in a known manner. With such a system, a reliable measurement of the gas mass flow through the fuel flow circuit 40 and air mass flow through the air flow circuit 27 is readily obtained so as to provide an accurate air fuel mixture ratio to the internal combustion engine 10.

With reference to FIG. 2, a more detailed perspective view of an internal combustion engine 100 incorporating the air mass flow sensor and gas mass flow sensor module 102 is illustrated. The particular components of the internal combustion engine will not be discussed in detail, however, it is to be noted that the air mass flow and gas mass flow sensing module 102 is readily positioned adjacent the internal combustion engine for providing an accurate air fuel mixture to the internal combustion engine. The air mass flow and gas mass flow module being illustrated in detail in FIG. 2A.

Figure 2A:
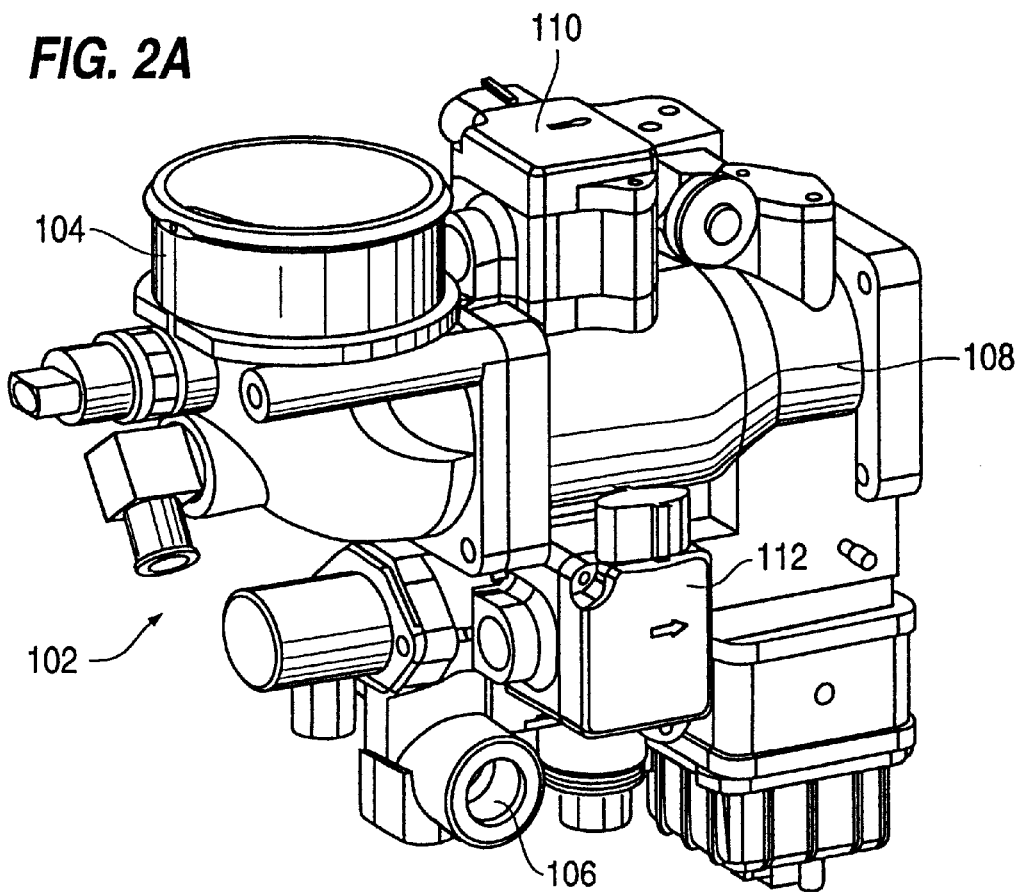
FIG. 2A is a perspective view of the mass flow sensor module in accordance with the present invention.

As can be seen from FIG. 2A, the air mass flow and gas mass flow module 102 includes an air intake passage 104 and a gas or fuel intake passage 106 with the air fuel mixture emanating from an outlet 108. Provided adjacent to air flow passage is an air mass flow sensor 110 while provided adjacent the fuel flow path is a fuel mass flow sensor 112. The particular components and structure of the air flow mass sensor and fuel flow mass sensor will be discussed in greater detail hereinbelow. Furthermore, it will become apparent that the disclosed air mass flow and gas mass flow module disclosed herein is capable of measuring large and small flows with the same basic sensor and may be used with various engine capacities as well as one which is insensitive to upstream flow conditions and the particular passage geometry and which is repeatable from sensor to sensor and from engine to engine to allow interchangability in the field.

Figure 7:
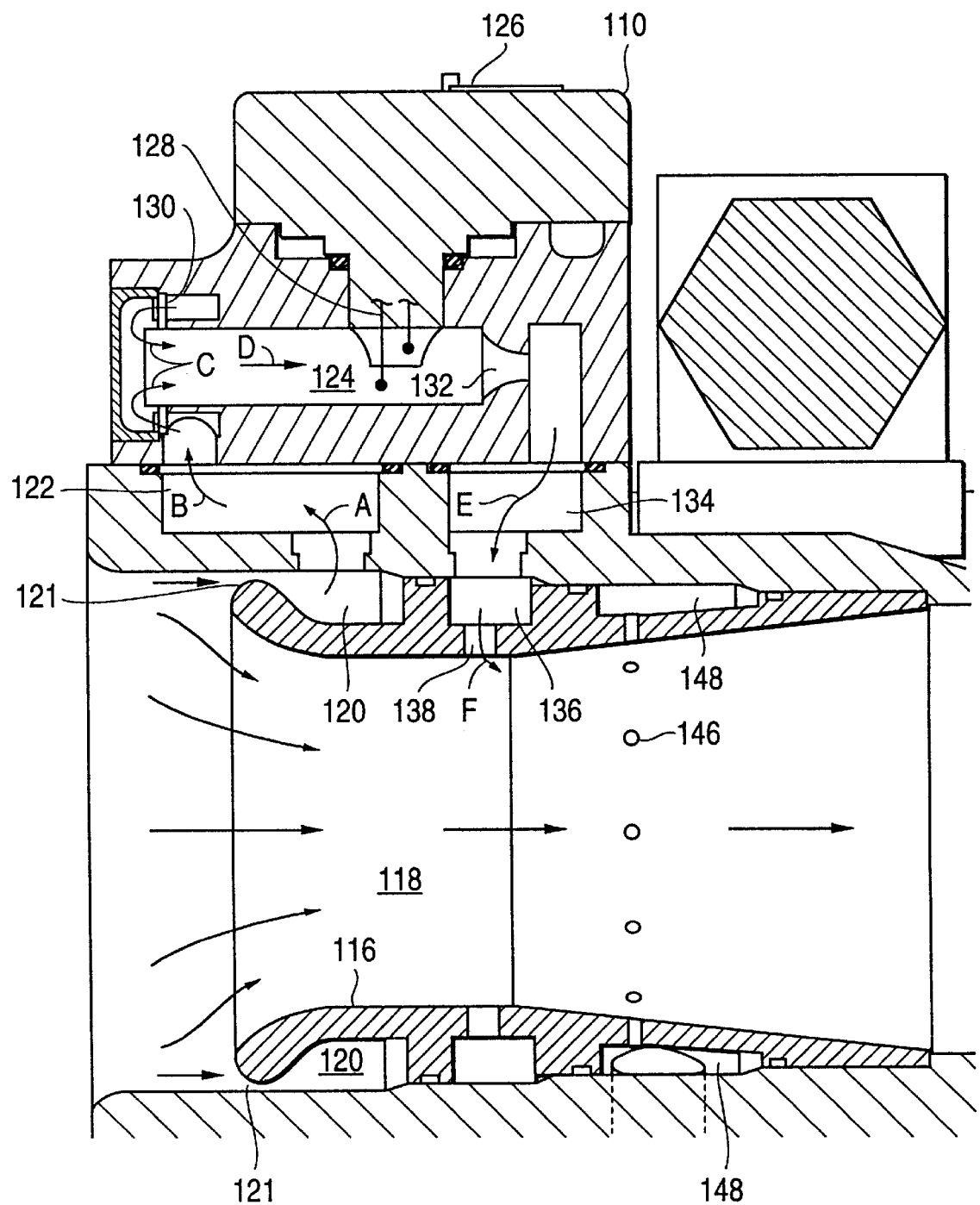
FIG. 7 is an expanded view of the air mass flow sensor illustrated in FIG. 3.
Figure 8:
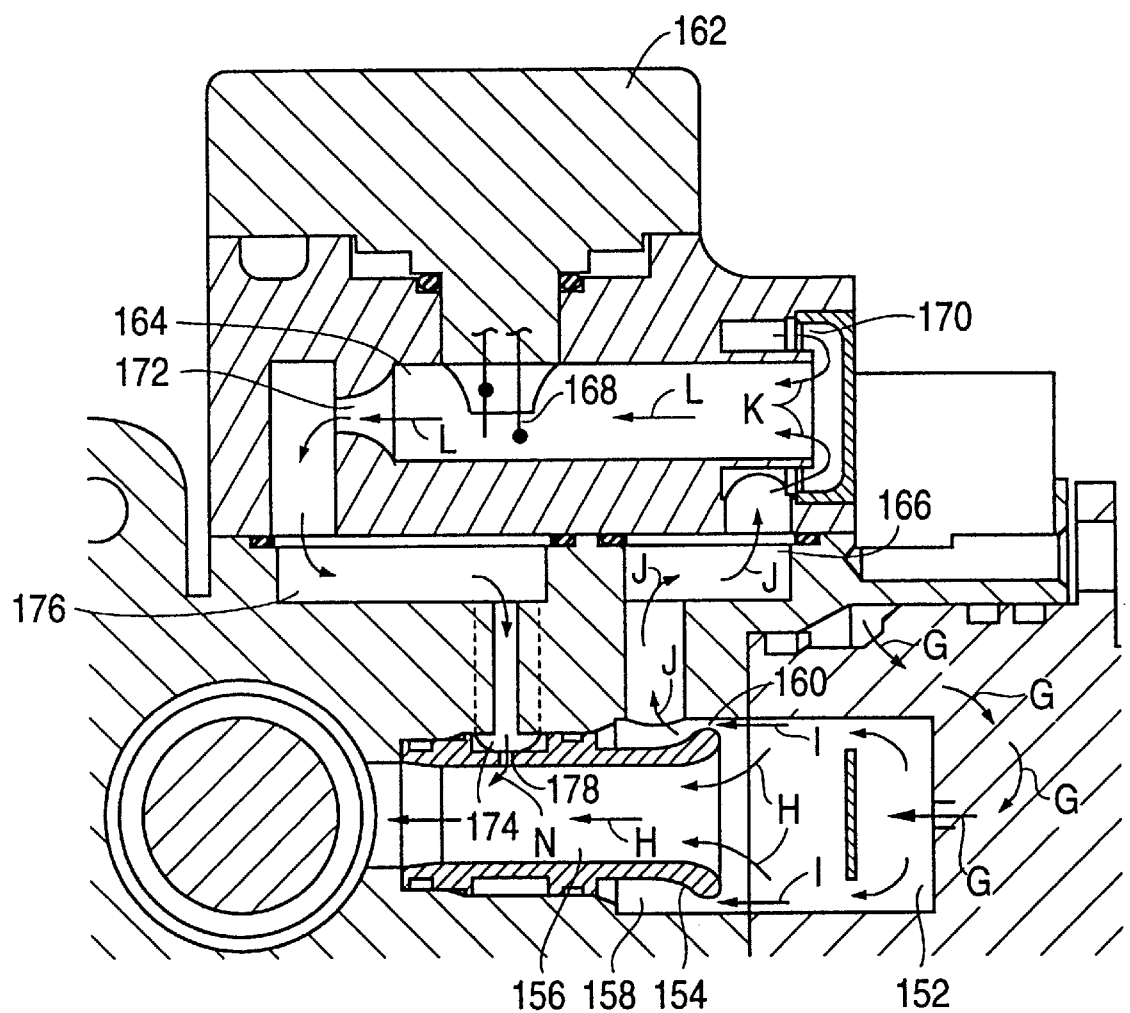
FIG. 8 is an expanded view of the compressed natural gas sensor mass flow sensor illustrated in FIG. 6.

With reference now to FIGS. 3 through 8, the details of the air fuel mass flow sensor module will be discussed in detail. Particularly, FIGS. 3 and 4 best illustrate the air mass flow sensor while FIGS. 5 and 6 best illustrate the fuel flow mass sensor. FIGS. 7 and 8 being expanded views of each of the flow sensors.

As discussed previously, the air fuel mass flow sensor module 102 includes an intake air flow passage 104 which turns at an elbow 114 at an angle of approximately 90°. Once the air flow passes the elbow 114, it is directed into the air mass flow detection portion of the module. Positioned within the air flow passage 104 is a nozzle 116 which creates a pressure reduction such that the pressure in passage 118 of the nozzle 116 is lower than the pressure in passage 104. The pressure difference from passage 104 to passage 118 causes a small percentage of the total flow through passage 104 to pass around the nozzle 116 and into an annulus 120. This annulus 120 extends 360° about the entire interior of the flow passage 104 and includes an inlet 121 which likewise extends 360° about the entire interior surface of the flow passage 104. Accordingly, air entering inlet 121 represents the average value of the static pressure in passage 104 which results in the flow of air passing to the air flow sensor to be an average percentage of the total flow through passage 104. Provided within the air mass flow detection device 110 is a communication passage 122 which communicates the air flow from the annulus 120 to a flow sensing passage 124. Positioned within the flow sensing passage 124 is a flow sensor 126 which may be of any known type. Particularly, the mass flow sensor utilized in accordance with the present invention is one which operates on the principal of heat transfer due to the fluid mass flow across the surface of a sensing element 128.

At an upstream end of the sensing flow passage 124 is an annulus 130 which provides a chamber with its outlet extending 360° about the entrance to the sensing flow passage 124. The flow passing through the communication passage 122 is evenly distributed by way of the annulus 130 so as to provide a distribution of flow as it enters the sensing flow passage 124. Further, this also provides an elongated length for sensing the mass flow through the sensing flow passage 124 in the limited available space. Accordingly, the air flow passing through the sensing flow passage 124 is consistent, uniform and evenly distributed as it passes across the sensing element 128 which results in a reliable flow measurement value from the flow sensor 126.

Downstream of the sensing element 128 is a calibrating orifice 132 for controlling the output of the air mass flow through the sensing flow passage 124. The flow sensor output is calibrated by changing the size of the calibrating orifice 132. Accordingly, the total flow of air through the sensing flow passage 124 may be readily determined by multiplying the output value from the flow sensor 126 by an appropriate numerical value which is determined by experimentation through known calibrated orifices. In this regard, the leading edge of the calibrating orifice 132 may be readily varied in order to influence the flow characteristics through the sensing flow passage 124. Moreover, it is desirable for the calibrating orifice 132 to have flow characteristics substantially identical to that of the nozzle 116 provided in the flow passage 104 in order to ensure that the overall system is insensitive to temperature variations. The air flow then passes through the orifice 132 and into chamber 134 where it is subsequently passed to a plenum 136 and into the main flow passage through outlet 138.

Figure 4:
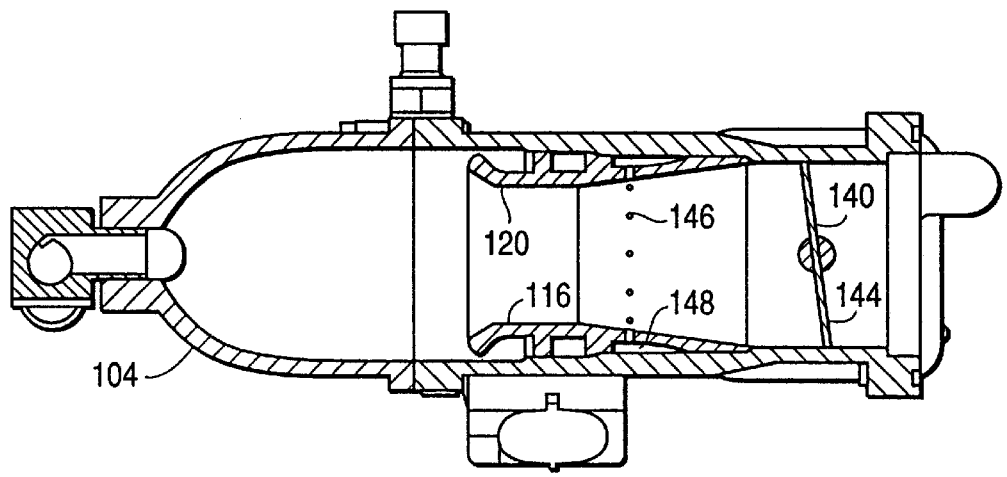
FIG. 4 is a cross-sectional view of the air mass flow sensor taken along line IV—IV of FIG. 3.
Figure 3:
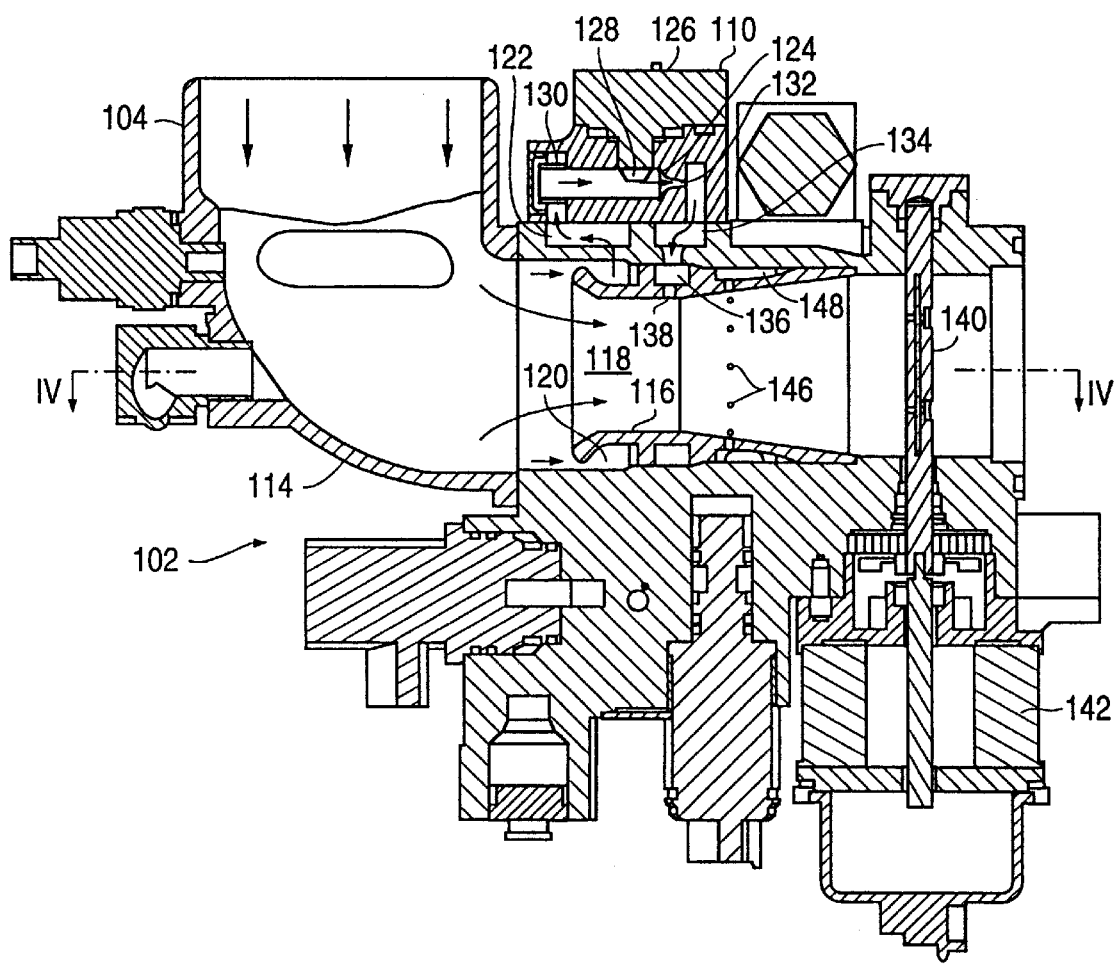
FIG. 3 is a cross-sectional view of the mass flow sensor module of FIG. 2.
Figure 6:
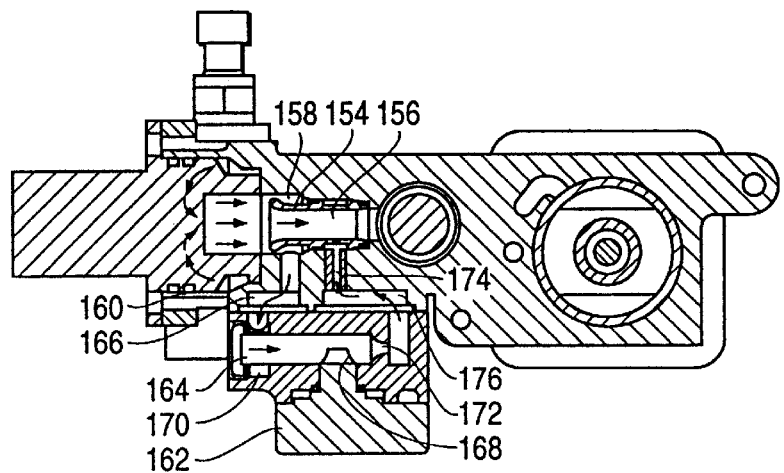
FIG. 6 is a cross-sectional view of the compressed natural gas flow sensor portion of the mass flow sensor modular taken along line VI—VI of FIG. 5.

As is best illustrated in FIG. 4, downstream of the nozzle 116 is a control valve 140 which controls the flow of air through the main flow passage 104 and subsequently the flow of an air fuel mixture to the internal combustion engine. As illustrated in FIG. 3, the valve 140 includes an actuator and position sensor 142 for accurately positioning the damper 144 of the valve 140 within the flow passage 104. Additionally, as can be seen from FIG. 4, it is a primary aspect of the present invention that the inlet 121 and the annulus 120 connecting passage 104 with passage 122 extends 360° around the parameter of the passage 118. In this regard, the flow entering the annulus 120 is an average value of the static pressure in passage 104 which results in the flow through the sensing flow passage 124 being representative of an average of the total flow in passage 104. Accordingly, the flow about the elbow 114 or any other flow disturbances which occur upstream of the air mass sensor result in little effect on the reliability of the mass flow sensed by the air mass flow sensor. Accordingly, the flow passing through the sensing flow passage 124 is constant, uniform and evenly distributed as it passes across the sensing element 128, thus resulting in a reliable flow measurement value from the mass flow sensor 126.

Figure 5:
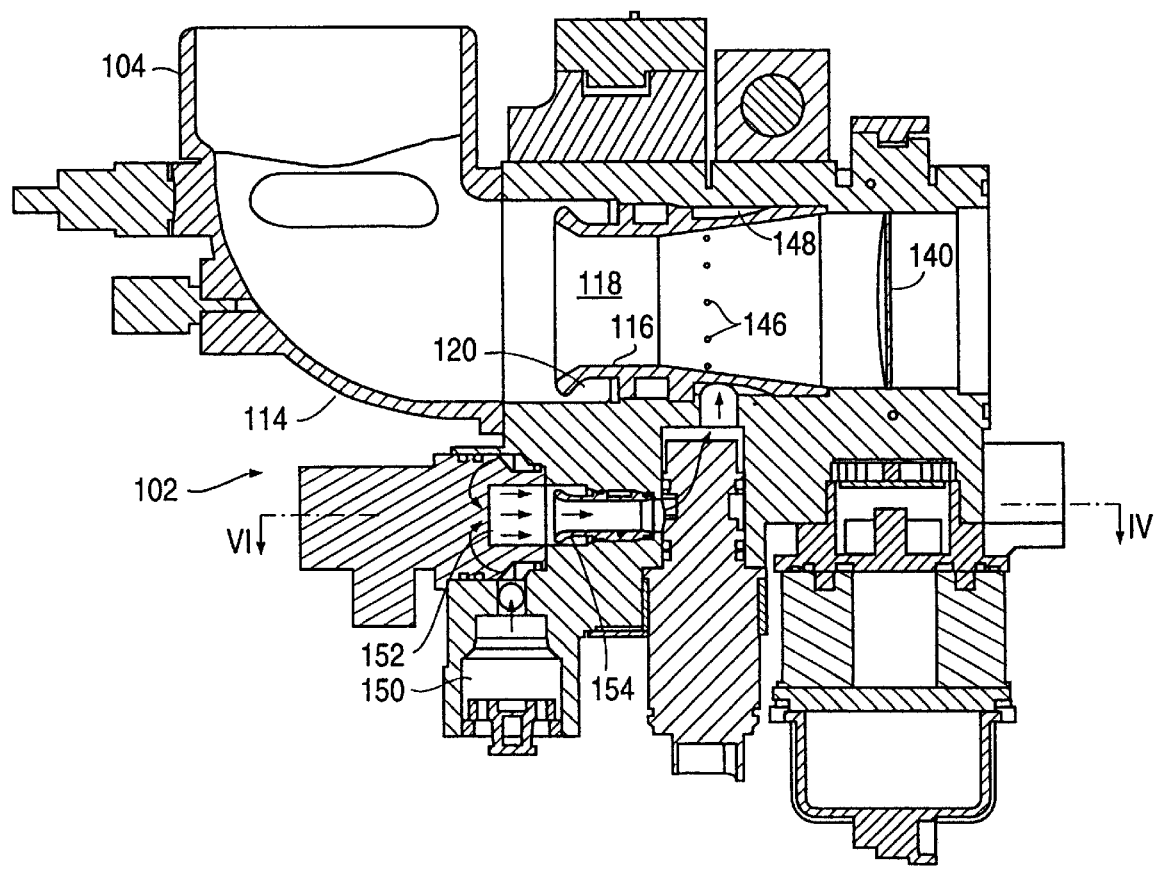
FIG. 5 is a cross-sectional view of the mass flow sensor illustrated in FIG. 2.

As can be seen from each of the FIGS. 3, 4, and 5, the nozzle 116 is provided with a plurality of openings 146 on or about a perimeter thereof which communicate with a plenum 148 formed between the nozzle 116 and main flow passage 104. The openings 146 and plenum 148 are utilized in disbursing the compressed natural gas into the main air flow passage 104 for mixing therewith and subsequent delivery to the internal combustion engine.

Referring now to FIG. 5, the particular structure of the fuel mass flow sensor which, as can be seen from FIG. 5, is positioned adjacent the main flow passage 104 of the air mass flow sensor within the flow sensing module 102, will be described in detail. Compressed natural gas passing through the fuel flow circuit 40 is directed to an inlet 150 of the fuel mass flow sensor. This fuel is then passed to a main flow passage 152 where the fuel is passed through a nozzle 154 positioned within the main flow passage 152 in a manner similar to that discussed herein above with respect to the air mass flow sensor. As with the nozzle 116, the nozzle 154 creates a pressure reduction such that the pressure within the passage 156 of the nozzle 154 is lower than the pressure in the passage 152. This pressure difference causes a small percentage of the total flow through the passage 152 to pass around the nozzle 154 and into an annulus 158 formed about the nozzle 154. The annulus 158 extends 360° about the entire interior of the flow passage 152 and includes an inlet 160 which likewise extends 360° about the entire interior surface of the flow passage 152. As with the air mass flow sensor, fuel entering the inlet 160 represents the average value of the static pressure in the passage 152 which results in the flow of fuel passing to the fuel mass flow sensor 162 to be an average percentage of the total flow through the passage 152.

Extending substantially parallel to the main flow passage 152 is a flow sensing passage 164 with a communication passage 166 being provided for directing the fuel mass flow from the annulus 158 to the flow sensing passage 164. Extending into the flow sensing passage 164 is a sensing element 168 of the mass flow sensor 162 which as with the air mass flow sensor is one which operates on the principle of heat transfer due to the fluid mass flow across the surface of the sensing element and may take on any known form.

As with the sensing flow passage 124, the sensing flow passage 164 includes an annulus 170 positioned upstream of the sensing flow passage 164 which provides a chamber with its outlet extending 360° about the entrance of the sensing flow passage 164. The flow passing through the communication passage 166 is evenly distributed by way of the annulus 170 so as to provide a distribution of flow as it enters the sensing flow passage 164. In doing so, the fuel flow passing through the sensing flow passage 164 is constant, uniform and evenly distributed as it passes across the sensing element 168 which results in a reliable flow measurement value from the flow sensor 162. Similarly, downstream of the sensing element 168 is a calibrating orifice 172 for controlling the output of the fuel mass flow through the sensing flow passage 164. The flow sensor output is calibrated by varying the size of the calibrating orifice 172. In this regard, the total flow of air through the sensing flow passage 164 may be readily determined by multiplying the output value from the flow sensor 162 by an appropriate numerical value which is determined by experimentation through the use of known calibrated orifices. Accordingly, the leading edge of the calibrating orifice 172 may be readily varied in order to influence the flow characteristics through the sensing flow passage 164. Further, as with the air mass flow sensor, it is desirable for the calibrating orifice 172 to have flow characteristics substantially identical to that of the nozzle 154 provided in the flow passage 152 in order to ensure that the overall system is insensitive to temperature variations.

Once the fuel flows through the calibrating orifice 172 it is passed to a plenum 174 formed between the nozzle 154 and the main flow passage 152 by way of return passage 176. From the plenum 174, the fuel is directed back into the fuel passage 156 through outlets 178. The fuel is then passed to the plenum 148. Once the fuel is in the plenum 148 it surrounds the nozzle 116 and passes into the main air flow passage 104 through outlets 146. As discussed herein above, this air fuel mixing capability is similar to that disclosed in U.S. application Ser. No. 581,961, filed Jan. 2, 1996 and assigned to the assignee of subject invention. Therein the compressed natural gas is disbursed uniformly about a periphery of the nozzle 116 and readily passes through outlets 146 and mixes with the air passing through the main flow passage 104. This mixture is then passed to the internal combustion engine in a known manner.

Referring to FIGS. 7 and 8, the air and fuel mass flow sensor portions of the mass flow module are illustrated in expanded views. FIG. 7 illustrates the air mass flow sensor wherein a portion of the air passing through the main air flow passage 104 is directed to the annulus 120 through inlet 121 due to the pressure difference from passage 104 to passage 118. The annulus 120 extends 360° about the entire interior surface of the flow passage 104 with the inlet 121 likewise extending 360° about the entire interior surface of the flow passage 104. Accordingly, air entering inlet 121 represents the average value of the static pressure in passage 104 which results in the flow of air passing to the air flow sensor to be an average percentage of the total flow through passage 104. Air passing through the air mass flow detection device 110 is directed to the communication passage 122 in the direction of arrow A which communicates the air flow from the annulus 120 to a flow sensing passage 124 in the direction of arrow B. At the upstream end of the sensing flow passage 124 is annulus 130 which includes an outlet extending 360° about the entrance to the sensing flow passage 124. The flow passing through the communication passage 122 is evenly distributed by way of the annulus 130 as shown by arrows C so as to provide a distribution of flow as it enters the sensing flow passage 124. The air flow continues passing through the sensing flow passage 124 in the direction of arrow D with this flow being consistent, uniform and evenly distributed as it passes across the sensing element 128 which results in a reliable flow measurement value from the flow sensor 126.

Downstream of the sensing element 128 is the calibrating orifice 132 for controlling the output of the air mass flow through the sensing flow passage 124. As noted hereinabove, the flow sensor output is calibrated by changing the size of the calibrating orifice 132. The air flow then passes through the orifice 132 and into chamber 134 in the direction of arrow E where it is subsequently passed to the plenum 136 and into the main flow passage through outlet 138 in a direction of arrow F.

As can be seen from FIG. 7, the nozzle 116 is provided with a plurality of openings 146 about a perimeter thereof which communicate with the plenum 148 formed between the nozzle 116 and main flow passage 104. The openings 146 and plenum 148 are utilized in disbursing the compressed natural gas into the main air flow passage 104 for mixture therewith and subsequent delivery to the internal combustion engine.

Referring now to FIG. 8, the flow of fuel through the fuel mass flow sensor will now be described in detail. Compressed natural gas passing through the fuel flow circuit 40 is directed to the inlet 150 (illustrated in FIG. 5) of the fuel mass flow sensor. This fuel is then passed to a main flow passage 152 in the direction of arrows G where the fuel is passed through the nozzle 154 positioned within the main flow passage 152 in the direction of arrows H. As with the nozzle 116, the nozzle 154 creates a pressure reduction such that the pressure within the passage 156 of the nozzle 154 is lower than the pressure in the passage 152. This pressure difference causes a small percentage of the total flow through the passage 152 to pass around the nozzle 154 and into an annulus 158 formed about the nozzle 154 as shown by arrows I. The annulus 158 extends 360° about the entire interior of the main flow passage 152 as does the inlet 160. As with the air mass flow sensor, fuel entering the inlet 160 represents the average value of the static pressure in the passage 152 which results in the flow of fuel passing to the fuel mass flow sensor 162 to be an average percentage of the total flow through the passage 152. The main flow passage may also include a baffle 163 which would aid in the disbursion of the fuel when entering the main flow passage 152.

As noted previously, extending substantially parallel to the main flow passage 152 is the flow sensing passage 164 with the communication passage 166 being provided for directing the fuel mass flow from the annulus 158 to the flow sensing passage 164 in the direction of arrows J. As with the sensing flow passage 124, the sensing flow passage 164 includes an annulus 170 positioned upstream of the sensing flow passage 164 which provides a chamber with its outlet extending 360° about the entrance of the sensing flow passage 164. The flow passing through the communication passage 166 is evenly distributed by way of the annulus 170 so as to provide a distribution of flow as it enters the sensing flow passage 164 as seen by arrows K. Accordingly, the fuel flow passing through the sensing flow passage 164 is constant, uniform and evenly distributed as it passes across the sensing element 168 in the direction of arrows L.

Downstream of the sensing element 168 is the calibrating orifice 172 for controlling the output of the fuel mass flow through the sensing flow passage 164. Once the fuel flows through the calibrating orifice 172 it is passed in the direction of arrows M to the plenum 174 formed between the nozzle 154 and the main flow passage 152 by way of return passage 176. From the plenum 174, the fuel is directed back into the fuel passage 156 through outlets 178 in the direction of arrows N. The fuel is then passed in the direction of arrow O (FIG. 5) and into plenum 148. Once the fuel is in the plenum 148 it surrounds the nozzle 116 and passes into the main air flow passage 104 through outlets 146. As discussed herein above, this air fuel mixing capability is similar to that disclosed in U.S. application Ser. No. 581,961, filed Jan. 2, 1996 and assigned to the assignee of subject invention. Therein the compressed natural gas is disbursed uniformly about a periphery of the nozzle 116 and readily passes through outlet 146 and mixes with the air passing through the main flow passage 104. This mixture is then passed to the internal combustion engine in a known manner.

Accordingly, in accordance with the foregoing, a mass flow measurement device for measuring air mass flow and gas or fuel mass flow to an internal combustion engine in a reliable manner is set forth. Additionally, a device which is able to measure large and small flows with the same basic sensor for use with various engine capacities is described, one which is insensitive to upstream flow conditions and the particular passage geometry and one which is repeatable from sensor to sensor and from engine to engine to allow interchangability in the field. Moreover, the foregoing describes a unitary sensing device which senses both the air flow to an internal combustion engine as well as the fuel flow to the internal combustion engine and which mixes the fuel with the air being directed to the internal combustion engine.

While the invention has been described with reference to a preferred embodiment, it should be appreciated by those skilled in the art that the invention may be practiced otherwise than as specifically described herein and without departing from the spirit and scope of the invention. It is therefore, to be understood that the spirit and scope of the invention be limited only by the appended claims.

We claim:

1. A unitary mass flow sensing and mixing device for sensing a flow of air and fuel for delivery to an internal combustion engine and mixing the fuel with the air prior to delivery of the air/fuel mixture to the internal combustion engine, said mass flow sensing and mixing device including;
    a main air flow passage having an inlet and an outlet for directing a flow of air to the internal combustion engine; said inlet communicating with a source of air and said outlet communicating with the internal combustion engine;

a secondary air flow passage for isolating a portion of said air flow from said main air flow passage; said secondary air flow passage including an inlet circumferentially surrounding said main air flow passage and an air flow sensing section;

an air mass flow sensor positioned in said flow sensing section of said secondary flow passage;

an air return passage for returning said portion of said air flow to said main flow passage;

a main fuel flow passage having an inlet and an outlet for directing a flow of fuel to said main air flow passage; said inlet communicating with a source of fuel and said outlet communicating with said main air flow passage;

a secondary fuel flow passage for isolating a portion of said fuel flow from said main fuel flow passage; said secondary fuel flow passage including an inlet surrounding said main fuel flow passage and a fuel flow sensing section;

a fuel mass flow sensor positioned in said fuel flow sensing section of said secondary fuel flow passage;

a fuel return passage for returning said portion of said fuel flow to said main flow passage;

a fuel mixing passage communicating between said main fuel flow passage and said main air flow passage for directing said fuel flow to said main flow passage; and at least one fuel mixing port for mixing said fuel with said air in said main air flow passage.

2. The mass flow sensing and mixing device as defined in claim 1, wherein the fuel is compressed natural gas.

3. The mass flow sensing and mixing device as defined in claim 1, wherein a nozzle is positioned in said main air flow passage, said nozzle including a nozzle inlet and a nozzle outlet wherein an outer diameter of said nozzle inlet is less than an inner diameter of said main air flow passage and said inlet of said secondary air flow passage is formed between said nozzle inlet and said main air flow passage.

4. The mass flow sensing and mixing device as defined in claim 1, wherein a flow direction of said air flow sensing section of said secondary air flow passage extends substantially parallel to a flow direction of said main air flow passage.

5. The mass flow sensing and mixing device as defined in claim 4, wherein said secondary air flow passage further comprises a communication section formed between said inlet of said secondary air flow passage and air flow sensing section.

6. The mass flow sensing and mixing device as defined in claim 5, further comprising an air flow sensing means communicating with said air flow sensing section for sensing a flow of air passing through said air flow sensing section.

7. The mass flow sensing and mixing device as defined in claim 6, further comprising an annulus formed about an inlet of said air flow sensing section and positioned upstream of said air flow sensing means for providing symmetrical air flow through said air flow sensing section.

8. The mass flow sensing and mixing device as defined in claim 6, further comprising a calibration orifice positioned downstream of said air sensing means.

9. The mass flow sensing and mixing device as defined in claim 8, wherein a nozzle is positioned in said main air flow passage, said nozzle including a nozzle inlet and a nozzle outlet wherein an outer diameter of said nozzle inlet is less than an inner diameter of said main air flow passage and said inlet of said secondary air flow passage is formed between said nozzle inlet and said main air flow passage.

10. The mass flow sensing and mixing device as defined in claim 9, wherein flow characteristics of said calibration orifice and said nozzle are substantially equal.

11. The mass flow sensing and mixing device as defined in claim 1, wherein a nozzle is positioned in said main fuel flow passage, said nozzle including a nozzle inlet and a nozzle outlet wherein an outer diameter of said nozzle inlet is less than an inner diameter of said main fuel flow passage and said inlet of said secondary fuel flow passage is formed between said nozzle inlet and said main fuel flow passage.

12. The mass flow sensing and mixing device as defined in claim 1, wherein a flow direction of said fuel flow sensing section of said secondary fuel flow passage extends substantially parallel to a flow direction of said main fuel flow passage.

13. The mass flow sensing and mixing device as defined in claim 12, wherein said secondary fuel flow passage further comprises a communication section formed between said inlet circumferentially of said secondary fuel flow passage and fuel flow sensing section.

14. The mass flow sensing and mixing device as defined in claim 13, further comprising a fuel flow sensing means communicating with said fuel flow sensing section for sensing a flow of fuel passing through said fuel flow sensing section.

15. The mass flow sensing and mixing device as defined in claim 14, further comprising an annulus formed about an inlet of said fuel flow sensing section and positioned upstream of said fuel flow sensing means for providing symmetrical fuel flow through said fuel flow sensing section.

16. The mass flow sensing and mixing device as defined in claim 14, further comprising a calibration orifice positioned downstream of said fuel sensing means.

17. The mass flow sensing and mixing device as defined in claim 16, wherein a nozzle is positioned in said main fuel flow passage, said nozzle including a nozzle inlet and a nozzle outlet wherein an outer diameter of said nozzle inlet is less than an inner diameter of said main fuel flow passage and said inlet of said secondary fuel flow passage is formed between said nozzle inlet and said main fuel flow passage.

18. The mass flow sensing and mixing device as defined in claim 17, wherein flow characteristics of said calibration orifice and said nozzle are substantially equal.

19. The mass flow sensing and mixing device as defined in claim 1, wherein a plurality of fuel mixing ports are formed in a portion of said main air flow passage for mixing said fuel with said air in said main air flow passage.

* * * * *